US012631118B2

(12) United States Patent
Liu

(10) Patent No.: US 12,631,118 B2
(45) Date of Patent: May 19, 2026

(54) SYSTEMS AND METHODS FOR SERVICING A TURBOMACHINE

(71) Applicant: GE Vernova Infrastructure Technology LLC, Greenville, SC (US)

(72) Inventor: Gang Liu, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/904,604

(22) Filed: Oct. 2, 2024

(65) Prior Publication Data

US 2026/0092531 A1 Apr. 2, 2026

(51) Int. Cl.
*F01D 5/30* (2006.01)
*F01D 5/32* (2006.01)

(52) U.S. Cl.
CPC ............. *F01D 5/3053* (2013.01); *F01D 5/32* (2013.01); *F05D 2230/64* (2013.01); *F05D 2270/52* (2013.01)

(58) Field of Classification Search
CPC ...... F01D 5/3007; F01D 5/32; F05D 2230/72; F05D 2230/80; F05D 2230/64; F05D 2230/642; F05D 2230/644
See application file for complete search history.

(56) References Cited

U.S. PATENT DOCUMENTS

| | | | | |
|---|---|---|---|---|
| 2,944,326 | A | 7/1960 | Stadthaus et al. | |
| 8,485,784 | B2 * | 7/2013 | Eastman | F01D 5/326 416/220 R |
| 9,506,357 | B1 | 11/2016 | Bassett | |
| 11,098,729 | B2 | 8/2021 | Colletti et al. | |
| 11,377,968 | B2 * | 7/2022 | Igarashi | F01D 5/02 |
| 11,525,363 | B2 * | 12/2022 | Sakamoto | F01D 5/326 |

FOREIGN PATENT DOCUMENTS

| | | | |
|---|---|---|---|
| CH | 708578 | A2 | 3/2015 |
| CN | 108223024 | A | 6/2018 |
| EP | 2439378 | A2 | 4/2012 |
| EP | 3211180 | A1 | 8/2017 |

OTHER PUBLICATIONS

European Search Report Corresponding to Application No. 25200972.5 on Mar. 10, 2026.

* cited by examiner

*Primary Examiner* — Christopher R Legendre
(74) *Attorney, Agent, or Firm* — Dority & Manning, P.A.

(57) ABSTRACT

In methods and systems for servicing a turbomachine having a rotor with a plurality of hook elements for receiving a retention device, current data indicating each current hook element having a dowel pin hole and a respective current number of stakes, a defined spacing rule, and a maximum number of stakes per dowel pin hole are received. For each current hook element, first potential combinations with other hook elements are determined based on the defined spacing rule, and the current number of stakes. First solution combinations are identified from the first potential combinations, where the current number of stakes at each of the hook elements in each of the first solution combinations is less than the maximum number of stakes. A user interface is controlled to indicate at least one desired solution of the first solution combinations having a highest number of potential future services.

13 Claims, 11 Drawing Sheets

8/11

SYSTEMS AND METHODS FOR SERVICING A TURBOMACHINE

FIELD OF THE INVENTION

The present disclosure relates generally to servicing turbomachines. Specifically, the present disclosure relates to systems and methods for servicing turbomachines that use dowel pins and stakes in a rotor of the turbomachine to limit movement of retention devices that support and/or retain rotor blades on the rotor.

BACKGROUND

Turbomachines, such as steam turbines, often include static nozzle assemblies that direct flow of a working fluid into rotor blades connected to a rotating rotor. The nozzle construction (including a plurality of nozzles, or “airfoils”) is sometimes referred to as a “diaphragm” or “nozzle assembly stage.” Each rotor blade includes a base with a dovetail that is sized to fit within a corresponding dovetail slot in the rotor. Many last stage rotor blades are of significant length and have a substantial weight. During low speed operation or “turning gear” operation, the blades may undesirably move axially along the dovetail slots in which they are retained, which can cause significant wear on the blade and/or the rotor. In many cases, wear on the blades and/or the rotor can cause outages, require repairs, and result in undesirable costs.

Blades are prevented from moving axially in the dovetail slots provided in the rotor by a retention device, such as a lockwire. For instance, hook elements, such as hook tabs, are formed around the radial periphery of the rotor wheel and similar blade hook elements are formed at the dovetails of the blades, where the hook elements on the rotor wheel and blades circumferentially align to define a slot for receiving the retention device. The free ends of the lockwire are shaped so that they come together at an overlapping joint, thus allowing for minor changes in length and diameter of the lockwire as the rotor, rotor slots, and blades expand and contract during transient periods. The lockwire is held in place by the radial spring force stemming from installation of a relatively larger-diameter lockwire in a relatively smaller-diameter annular slot, and by dowel pins mounted in the rotor. The dowel pins may be prevented from falling out of the rotor by stakes.

During servicing of the rotor blades, heads of the stakes are cut off to enable removal of the dowel pins, while leaving the remaining portion of the stakes in the rotor. Thus, when the rotor blades are re-installed, new stakes must be positioned at different locations around the dowel pins. However, the number of positions that stakes may be placed around the dowel pins is limited. Moreover, an operator must decide which hook elements will receive dowel pins in alignment with the required dowel pin spacing. However, given the large number of hook elements on rotors, it is time consuming for an operator to consider every option that aligns with the required dowel pin spacing and available stake holes. Moreover, if an operator does not select the option with the greatest number of subsequent service opportunities, the serviceable life of the rotor is negatively reduced.

As such, systems and methods for servicing turbomachine rotor blades that reduces time, effort, and potential error during servicing while providing the greatest number of subsequent service opportunities would be desirable in the art.

BRIEF DESCRIPTION

Aspects and advantages of the present disclosure will be set forth in part in the following description, or may be obvious from the description, or may be learned through practice of the technology.

In accordance with one embodiment, a method for servicing a turbomachine is provided. The turbomachine has a rotor and a plurality of rotor blades, where the rotor has a plurality of hook elements for receiving a retention device. The method may include receiving, by a computing system, current data indicating each current hook element of the plurality of hook elements that has a dowel pin hole and a current number of stakes for each current hook element. The method may further include receiving, by the computing system, a defined spacing rule for dowel pins in the plurality of hook elements. Further, the method may include receiving, by the computing system, a maximum number of stakes per dowel pin hole. Furthermore, the method may include determining, by the computing system, for each current hook element, first potential combinations of other hook elements of the plurality of hook elements with the respective current hook element based on the defined spacing rule, and the current number of stakes at each of the hook elements of each of the first potential combinations. The method may further include identifying, by the computing system, first solution combinations from the first potential combinations, where the current number of stakes at each of the hook elements in each of the first solution combinations may be less than the maximum number of stakes. Moreover, the method may include determining, by the computing system, at least one desired solution of the first solution combinations having a highest number of potential future services. Additionally, the method may include controlling, by the computing system, a user interface to indicate the at least one desired solution.

In accordance with another embodiment, a system for servicing a turbomachine is provided. The system may include a turbomachine having a rotor and a plurality of rotor blades, with the rotor having a plurality of hook elements for receiving a retention device. The system may further include a user interface, and a computing system. The computing system may be configured to receive current data indicating each current hook element of the plurality of hook elements that has a dowel pin hole and a current number of stakes for each current hook element, receive a defined spacing rule for dowel pins in the plurality of hook elements, and receive a maximum number of stakes per dowel pin hole. The computing system may further be configured to determine for each current hook element, first potential combinations of other hook elements of the plurality of hook elements with the respective current hook element based on the defined spacing rule, and the current number of stakes at each of the hook elements of each of the first potential combinations. Further, the computing system may be configured to identify first solution combinations from the first potential combinations, where the current number of stakes at each of the hook elements in each of the first solution combinations may be less than the maximum number of stakes. Moreover, the computing system may be configured to determine at least one desired solution of the first solution combinations having a highest number of potential future services. Additionally, the computing system may be configured to control the user interface to indicate the at least one desired solution.

In accordance with additional embodiments, another method for servicing a turbomachine is provided. The turbomachine may have a rotor and a plurality of rotor blades, where the rotor may have a plurality of hook elements for receiving a retention device. The method may include inputting, via a user interface of a computing system, current data indicating each current hook element of the plurality of hook elements that has a dowel pin hole and a current number of stakes for each current hook element. The method may further include inputting, via the user interface of the computing system, a defined spacing rule for dowel pins in the plurality of hook elements. The method may similarly include inputting, via the user interface of the computing system, a maximum number of stakes per dowel pin hole. The method may further include determining, by the computing system, for each current hook element, first potential combinations of other hook elements of the plurality of hook elements with the respective current hook element based on the defined spacing rule, and the current number of stakes at each of the hook elements of each of the first potential combinations. Further, the method may include identifying, by the computing system, first solution combinations from the first potential combinations, where the current number of stakes at each of the hook elements in each of the first solution combinations may be less than the maximum number of stakes. Furthermore, the method may include determining, by the computing system, at least one desired solution of the first solution combinations having a highest number of potential future services. Moreover, the method may include controlling, by the computing system, the user interface to indicate the at least one desired solution. Additionally, the method may include installing the dowel pins and the stakes into the rotor based at least in part on the at least one desired solution.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention including the best mode of making and using the present systems and methods, directed to one of ordinary skill in the art, is set forth in the specification, which makes reference to the appended figures, in which.

Figure 1:
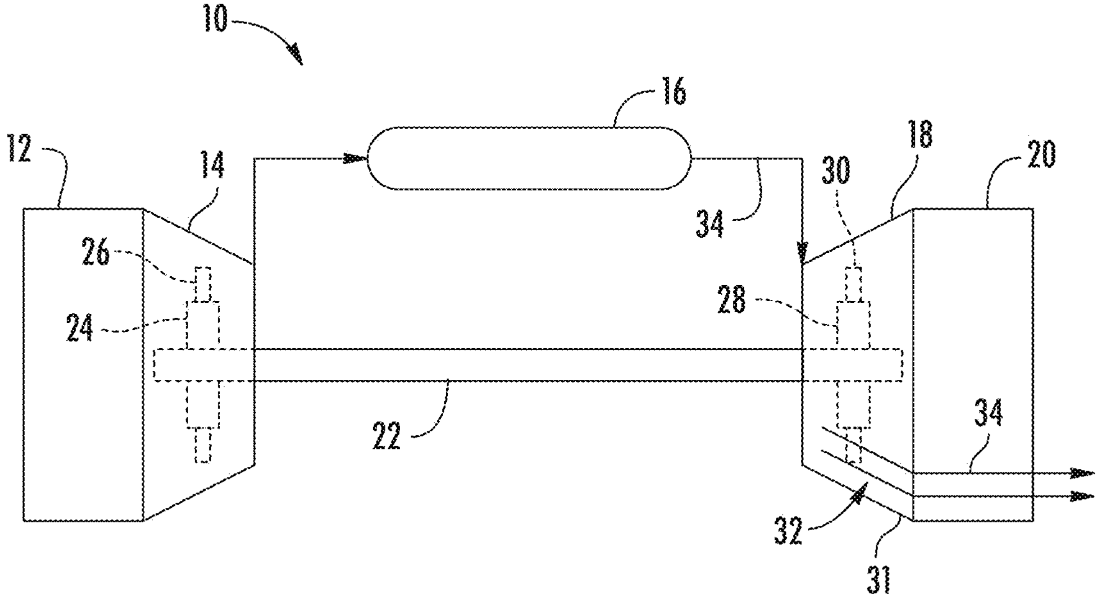
FIG. 1 illustrates a schematic illustration of an example turbomachine in accordance with aspects of the present disclosure.

Repeat use of reference characters in the present specification and drawings is intended to represent the same or analogous features or elements of the present technology.

DETAILED DESCRIPTION

Reference now will be made in detail to embodiments of the present invention, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components.

The term “fluid” may be a gas or a liquid. The term “fluid communication” means that a fluid is capable of making the connection between the areas specified.

As used herein, the terms “upstream” (or “forward”) and “downstream” (or “aft”) refer to the relative direction with respect to fluid flow in a fluid pathway. For example, “upstream” refers to the direction from which the fluid flows, and “downstream” refers to the direction to which the fluid flows. However, the terms “upstream” and “downstream” as used herein may also refer to a flow of electricity. The term “radially” refers to the relative direction that is substantially perpendicular to an axial centerline of a particular component, the term “axially” refers to the relative direction that is substantially parallel and/or coaxially aligned to an axial centerline of a particular component and the term “circumferentially” refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, the present subject matter is directed to systems and methods for servicing a turbomachine. More specifically, a turbomachine may have a rotor and a plurality of rotor blades. Each rotor blade includes a base configured to fit within a corresponding slot in the rotor. For instance, hook elements, such as hook tabs, are formed around the radial periphery of rotor wheel and similar blade hook elements are formed at the dovetails of the blades, where the hook elements on the rotor wheel and on the blades circumferentially align when the blades are installed on the rotor to define an annular slot. A retention device, such as a lockwire, is configured to be received within the annular slot to prevent the blades from sliding axially along the slots in the rotor. The lockwire is held in place by the radial spring force stemming from installation of a relatively larger-diameter lockwire in the relatively smaller-diameter annular slot, and by dowel pins mounted in the rotor. Each of the dowel pins may be prevented from falling out of the turbine rotor by one or more stakes.

During servicing of the rotor blades, heads of the stakes are cut off to enable removal of the dowel pins. Thus, when the rotor blades are re-installed, new stakes must be positioned at different locations around the dowel pins. However, the number of positions that stakes may be placed around each of the dowel pins is limited. Moreover, an operator must decide where to place the dowel pins in alignment with the required dowel pin spacing and the available stake positions around each dowel pin. However, given the large number of hook elements on rotors, it is time consuming for an operator to consider every option that aligns with the required dowel pin spacing. For example, some rotors have ninety-two hook tabs within which thirteen dowel pins are required to be placed in accordance with the dowel pin spacing rules, where four or six stakes (two or three pairs of stakes) are initially available for each dowel pin hole. If an operator does not select an option with the greatest number of subsequent service opportunities, the serviceable life of the rotor may be negatively reduced. Additionally, sometimes errors occur when installing stakes that require the improperly installed stakes to be cut off and alternative stake locations to be used, which requires solutions to be re-determined, requiring even more time and effort.

As such, in accordance with aspects of the present subject matter, systems and methods are provided that help to automatically determine the best servicing plans for placement of the dowel pins and stakes that provide the best future servicing potential. Such automatic methods greatly reduce the number of calculations needed during servicing, ensure that servicing plans meet the required dowel pin spacing requirements, and decrease instances of unnecessary dowel pin hole drilling, which reduces the time, overall cost, and risk for servicing. Moreover, such automatic determinations may help an operator decide between the best servicing plans, such as by providing the number of potential future services for each servicing plan, emphasizing servicing plans with the highest number of potential future services from other plans (e.g., sorting servicing plans from highest to lowest number of potential future services, filtering out servicing plans that have fewer than a certain number of servicing plans, highlighting, coloring, underlining, etc. service plans with the highest number of potential future services differently from other plans, etc.), and/or the like.

Referring now to the drawings, FIG. 1 illustrates a schematic diagram of one embodiment of a turbomachine, which in the illustrated embodiment is a gas turbine 10. Gas turbine 10 may be an industrial or land-based gas turbine. However, it should be appreciated that the present disclosure is not limited to an industrial and/or land-based gas turbine. Instead, the invention as described herein may use any suitable type of turbomachine including, but not limited to, a steam turbine, an aircraft gas turbine, or a marine gas turbine.

As shown, gas turbine 10 generally includes an inlet section 12, a compressor section 14 disposed downstream of inlet section 12, a plurality of combustors (not shown) within a combustor section 16 disposed downstream of compressor section 14, a turbine section 18 disposed downstream of combustor section 16, and an exhaust section 20 disposed downstream of turbine section 18. Additionally, gas turbine 10 may include one or more shafts 22 coupled between compressor section 14 and turbine section 18.

Compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of shaft 22 that extends through compressor section 14. Compressor section 14 may further include one or more stator vanes (not shown) arranged circumferentially around shaft 22. Stator vanes may be fixed to a compressor casing or static casing that extends circumferentially around rotor blades 26.

Turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of shaft 22 that extends through turbine section 18. Turbine section 18 further includes a turbine casing 31 that circumferentially surrounds a portion of shaft 22 and rotor blades 30, thereby at least partially defining a hot gas path 32 through turbine section 18. Turbine casing 31 may be configured to support a plurality of stages of stationary nozzles (not shown) extending radially inwardly from the inner circumference of turbine casing 31.

During operation, a working fluid, such as air, flows through inlet section 12 and into compressor section 14 where the air is progressively compressed, thus providing pressurized air to the combustors of combustor section 16. The pressurized air is mixed with fuel and burned within each combustor to produce combustion gases 34. Combustion gases 34 flow through hot gas path 32 from combustor section 16 into turbine section 18, wherein energy (kinetic and/or thermal) is transferred from combustion gases 34 to rotor blades 30, causing shaft 22 to rotate. The mechanical rotational energy may then be used to power compressor section 14 and/or to generate electricity. Combustion gases 34 exiting turbine section 18 may then be exhausted from gas turbine 10 via exhaust section 20.

Figure 2:
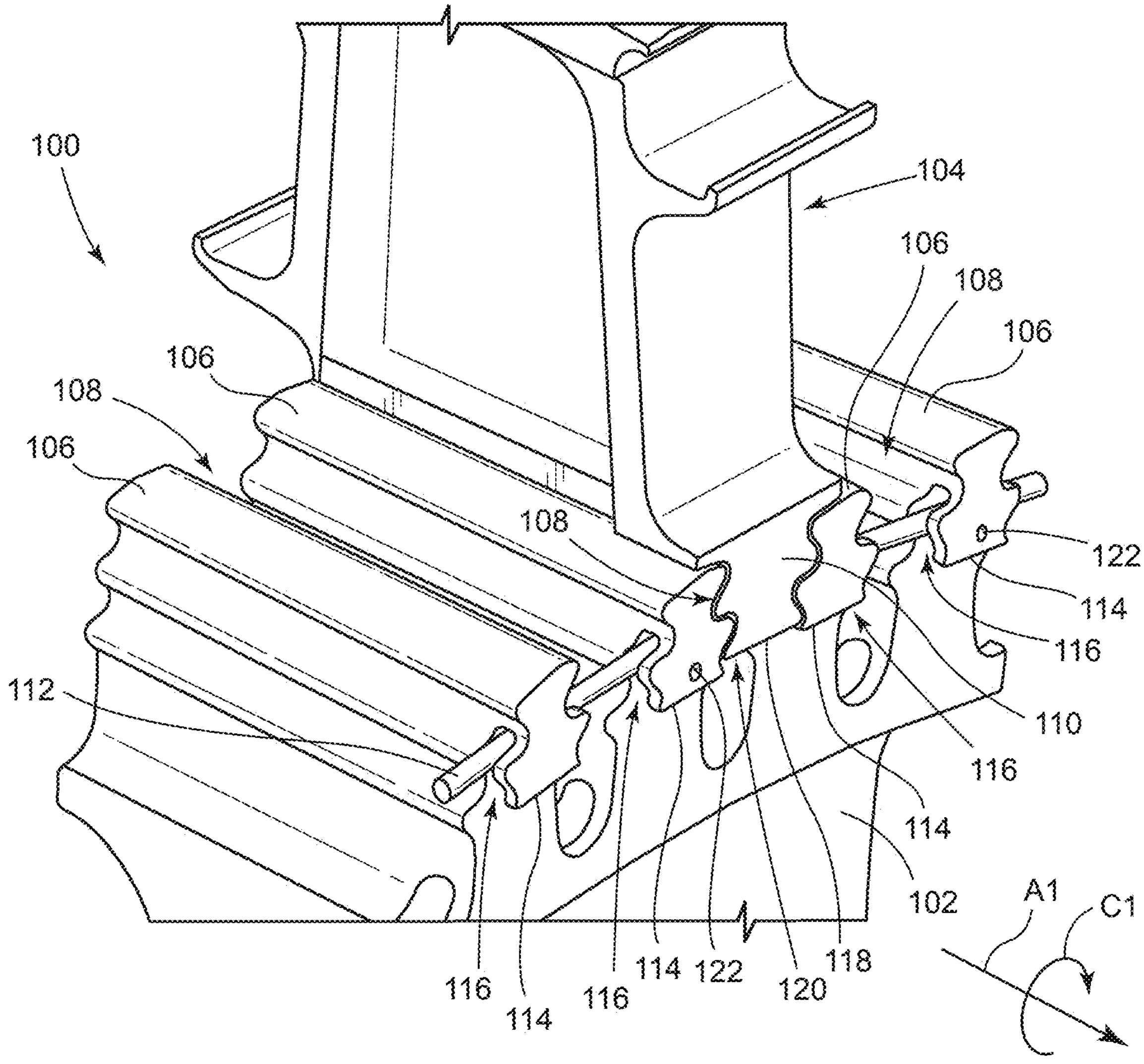
FIG. 2 illustrates a partial top perspective view of a turbine rotor and blade assembly of a turbomachine, such as the turbomachine of FIG. 1, the assembly having a retention device in accordance with embodiments of the present disclosure.
Figure 3:
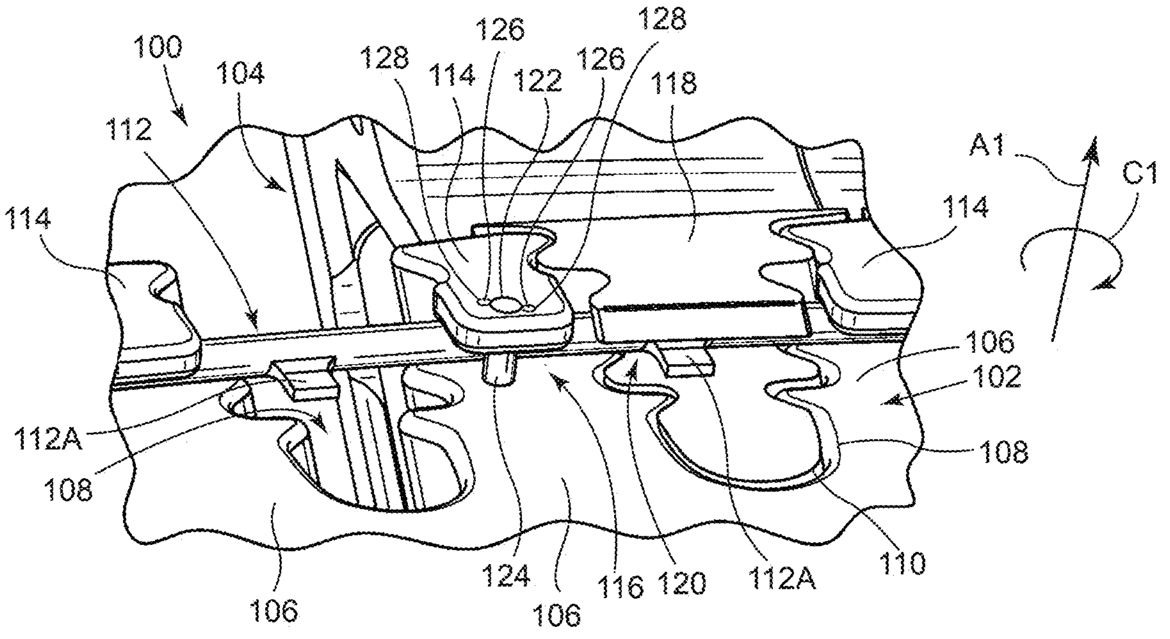
FIG. 3 illustrates a partial bottom perspective view of the turbine rotor and blade assembly of FIG. 2 in accordance with embodiments of the present disclosure.
Figure 4:
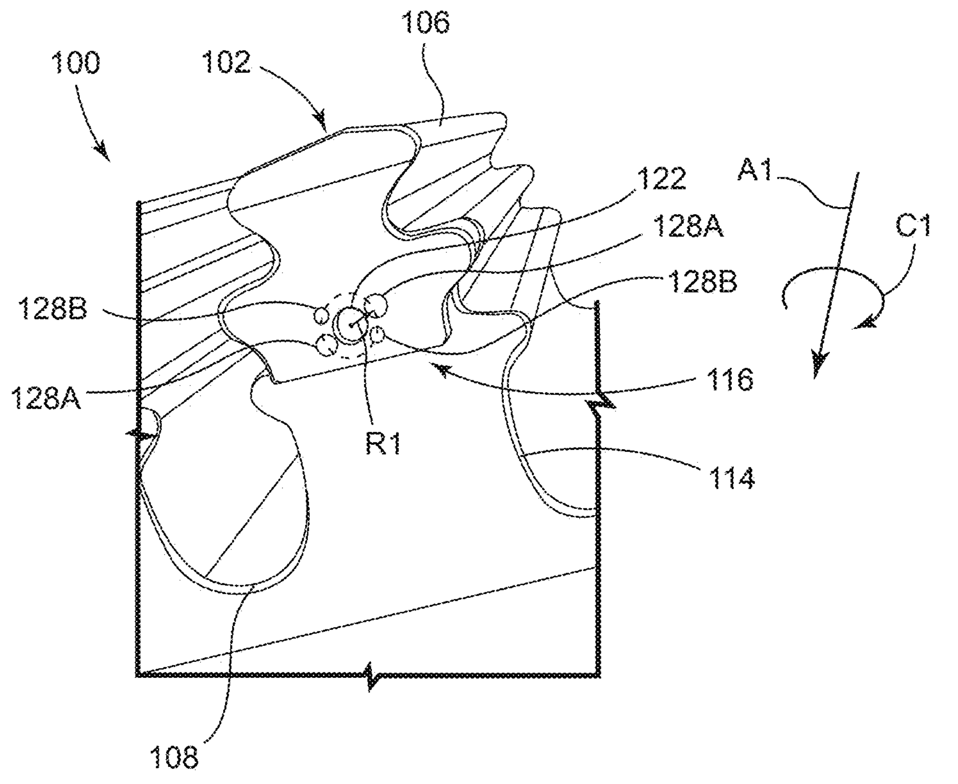
FIG. 4 illustrates a partial side view of the turbine rotor of FIGS. 2-3 in accordance with embodiments of the present disclosure.

Referring now to FIGS. 2-4, various views of a turbine rotor and blade assembly 100 are shown in accordance with aspects of the present subject matter. For instance, FIG. 2 illustrates a partial top perspective view of the turbine rotor and blade assembly 100 of a turbomachine, such as of the turbomachine 10 of FIG. 1, the assembly particularly illustrating a retention device. FIG. 3 illustrates a partial bottom perspective view of the turbine rotor and blade assembly 100 of FIG. 2. Additionally, FIG. 4 illustrates a partial side view of a turbine rotor of the turbine rotor and blade assembly 100 of FIGS. 2-3.

As particularly shown in FIG. 2, the turbine rotor and blade assembly 100 includes a turbine rotor 102 and a plurality of blades 104 (one of which is shown) configured to be coupled to the rotor 102. It should be appreciated that, in some instances, one or both of the rotor disks 24, 26 is configured the same as rotor 102, with the corresponding blades 26, 30 being configured the same as blades 104. The turbine rotor 102 has a plurality of radially projecting portions 106 spaced apart about the entire outer periphery of the rotor 102. A plurality of dovetail slots 108 are defined in the rotor 102, with each of the dovetail slots 108 being defined between a respective pair of the radially projecting portions 106. The dovetail slots 108 may extend substantially along (e.g., parallel to and along) an axial direction A1. Each of the dovetail slots 108 in the rotor 102 is configured to receive a corresponding dovetail portion 110 of a respective one of the blades 104.

The radially projecting portions 106 of the rotor 102 and the dovetail portions 110 of the blades 104 are configured to receive a retention device 112, such as a lockwire, to prevent the blades 104 from sliding within the dovetail slots 108 along the axial direction A1. For instance, each of the radially projecting portions 106 of the rotor 102 has a respective hook element 114, such as a hook tab, at a first end of the rotor 102 in the axial direction A1. Each hook tab 114 may at least partially define a slot 116 extending through an entirety of the respective, radially projecting portion 106 in a circumferential direction C1. Each slot 116 may be open at a radially inward end of the hook tab 114 and closed at the radially outward end of the hook tab 114. Similarly, the dovetail portion 110 of each of the blades 104 has a respective blade hook element 118 (e.g., blade hook tab), at a first axial end of the dovetail portion 110 in the axial direction A1. As best shown in FIG. 3, each blade hook tab 118 may at least partially define a slot 120 extending through an entirety of the respective dovetail portion 110 in the circumferential direction C1. Each slot 120 may be open at a radially inward end of the blade hook tab 118 and closed at the radially outward end of the blade hook tab 118. The slots 116 in the radially projecting portions 106 may be aligned with the slots 120 in the blades 104 in the circumferential direction C1 and the axial direction A1 to form an annual slot for receiving the lockwire 112. As such, the lockwire 112 may be received by the hook tabs 114 and the blade hook tabs 118.

In some instances, the lockwire 112, the hook tabs 114, and/or the blade hook tabs 118 further includes one or more features for preventing rotation of the lockwire 112 within the slots 116, 120. For instance, as shown in FIG. 3, the lockwire 112 includes lockwire tabs 112A received within the slots 120 such that rotation of the lockwire 112 is limited by engagement between the blade hook tabs 118 and the lockwire tabs 112A.

To retain the lockwire 112 within the slots 116, 120 defined by the hook tabs 114, 118, at least some of the hook tabs 114 of the rotor 102 may be configured to receive one or more limiting elements, such as dowel pins. For instance, at least some of the hook tabs 114 may define a dowel pin hole 122 for receiving a dowel pin 124. As best shown in FIG. 3, the dowel pin hole 122 may be positioned radially inwardly compared to the lockwire 112 such that, when a dowel pin 124 is received in a respective dowel pin hole 122, the lockwire 112 cannot be removed until the dowel pin 124 is removed.

After a dowel pin 124 is inserted in a dowel pin hole 122, the dowel pin 124 may be held within the dowel pin hole 122 by one or more respective stakes 126. Each stake 126 may be received within a corresponding stake hole 128 defined in the hook tab 114. Each stake 126 may have a shaft portion and a relatively larger head portion at one longitudinal end of the shaft portion. As such, when the shaft portion of the stake 126 is installed in the rotor 102, the head portion of each stake 126 protrudes from the stake hole 128 and at least partially overlaps an end of the dowel pin 124. As such, to remove a dowel pin 124, the head portion of each corresponding stake 126 must be cut off, leaving the remainder of the stake 126 (e.g., shaft portion) in the rotor 102. Accordingly, the stake holes 128 are spaced apart around the dowel pin hole 122 such that the stake holes 128 (and the respective shaft portions of the stakes 126) do not overlap.

In some instances, at least one pair of stakes 126 may be required for each dowel pin 124. In one or more instances, the stakes 126 of each pair are positioned on substantially opposite sides of a respective dowel pin 124 (e.g., spaced apart about 180 degrees about the dowel pin 124). For instance, as shown in FIG. 4, the stake holes 128 of a hook tab 114 includes a pair of first stake holes 128A and a pair of second stake holes 128B. It should be appreciated that while only two pairs of stake holes 128A, 128B are shown, depending on the size of the hook tab 114, the position of the dowel pin hole 122 in the hook tab 114, and the space between the lockwire 112 and the dowel pin hole 122, and the dimensions of the stakes 126, one or more additional stake holes 128 (e.g., additional pairs of stake holes 128) may also be provided for receiving stakes 126.

In some instances, designated pairs of stake holes 128A, 128B may have one or more distinguishing features to help an operator identify proper staking pairs. For instance, in the illustrated example, the stake holes 128 are only partially drilled before stake installation such that the stake holes 128 need to be drilled further before the stakes 126 may be received. In some instances, the diameter of partially drilled portions of the pairs of stake holes 128 may vary to indicate to an operator which stake holes to pair together (e.g., opposite, not directly adjacent pairs). For example, a diameter of the partially drilled portion of the first stake holes 128A may be different than a diameter of the partially drilled portion of the second stake holes 128B to indicate to an operator which stake holes to pair together. In such instances, the stake holes 128A, 128B may be configured to be drilled further with the same diameter drill bit, and the stake holes 128A, 128B are each centered at a same radius RI from a center of the dowel pin hole 122, such that the same size stakes 126 may be received in the stake holes 128A, 128B.

Figure 5A:
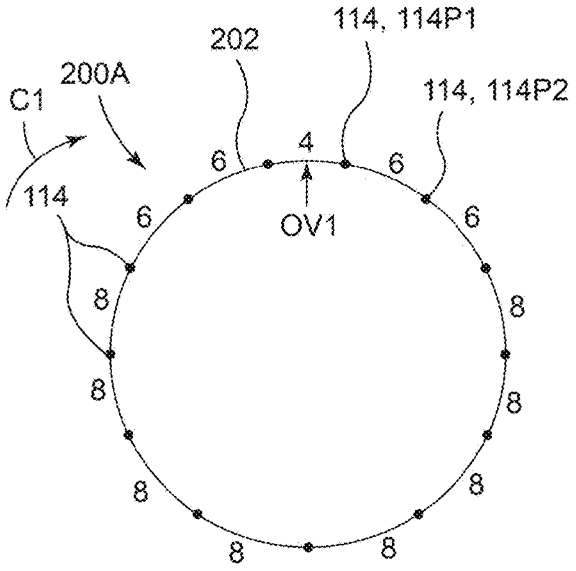
FIGS. 5A-5C illustrate example defined spacing rules for the turbine rotor of FIGS. 2-4 in accordance with embodiments of the present disclosure.
Figure 5B:
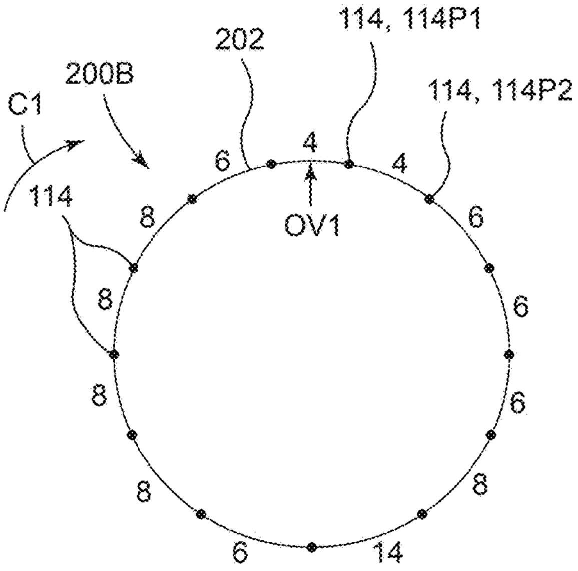
Figure 5C:
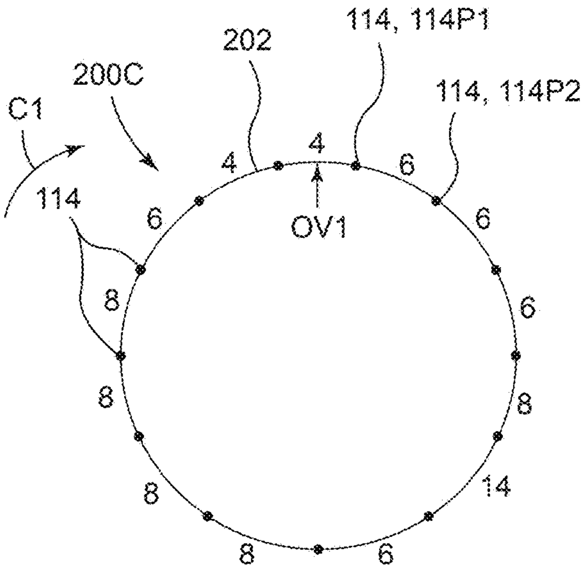

A minimum number of dowel pins 124 are required to properly retain the lockwire 112. In general, it is beneficial to only use the minimum number of dowel pins 124 at a given time to maximize the potential number of services for the rotor 102 and reduce costs. One or more defined spacing rules may be developed for different rotor configurations that describe the required spacing between hook tabs 114 that receive dowel pins 124 to ensure the proper stability of the lockwire 112 with the minimum number of dowel pins 124. For instance, FIGS. 5A-5C illustrate different example spacing rules 200A, 200B, 200C for a minimum of thirteen dowel pins 124 across ninety-two hook tabs 114 on a schematic rotor circumference 202, where the spacing of the hook tabs 114 is defined with respect to an overlap location OVI of ends of a lockwire (e.g., lockwire 112). It should be appreciated that the overlap location OVI may vary across different services, which allows a selected spacing rule to be oriented in multiple ways around a given rotor 102. A respective hook tab 114 to receive a dowel pin 124 (alternatively referred to herein as a "pinned hook tab 114") is spaced apart from a next pinned hook tab 114 by a number of hook tabs as correspondingly written between such pinned hook tabs. For instance, a second pinned hook tab 114P2 is the sixth hook tab 114 clockwise from a first pinned hook tab 114P1 in FIGS. 5A and 5C, but the fourth hook tab 114 clockwise from the first pinned hook tab 114P1 in FIGS. 5B. Typically, a spacing rule will be selected for the life of the rotor 102. While the illustrated rotor 202 in the spacing rules 200A, 200B, 200C of FIGS. 5A-5C has ninety-two hook tabs 114 and is configured to be used with the minimum of thirteen dowel pins 124, any suitable spacing rule may instead be used that matches the number of hook tabs 114 present and the suitable minimum number of dowel pins 124.

As indicated above, during servicing of the rotor, heads of stakes 126 may be cut off to allow removal of dowel pins 124, requiring different stake holes 128 to be used when installing new stakes 126 on the same hook tabs 114. However, when hook tabs 114 only have room for a limited number of stakes 126 (e.g., two or three pairs of stake holes 128), servicing is similarly limited. For instance, if a given hook tab 114 initially has two pairs of stake holes 128, where a pair of stakes 126 must be installed for each dowel pin 124, and no error occurs during installation, then such hook tab 114 has a maximum of two staking installations (e.g., the original staking, and one service). Similarly, if a given hook tab 114 has three pairs of stake holes 128, and no error occurs during installation, then such hook tab 114 has a maximum of three staking installations (e.g., the original staking, and two services). As the overlap location OVI may vary, there may be other combinations of hook tabs 114 that can be used to allow for additional services of the rotor 102. However, given the number of hook tabs 114 present on the rotor 102 being serviced (e.g., ninety-two hook tabs 114), the minimum number of dowel pins (e.g., thirteen), and variations in the number of staking operations available for each hook tab 114 over multiple services, it may be difficult and time consuming for an operator to calculate all of the possible solutions for selecting hook tabs 114 to be used, let alone the best solution to use to provide the most service life. Moreover, if an error occurs during a staking operation that prevents use of one or more stake holes 128 at a selected hook tab 114, new solutions may need to be calculated, leading to further effort and time.

Figure 6:
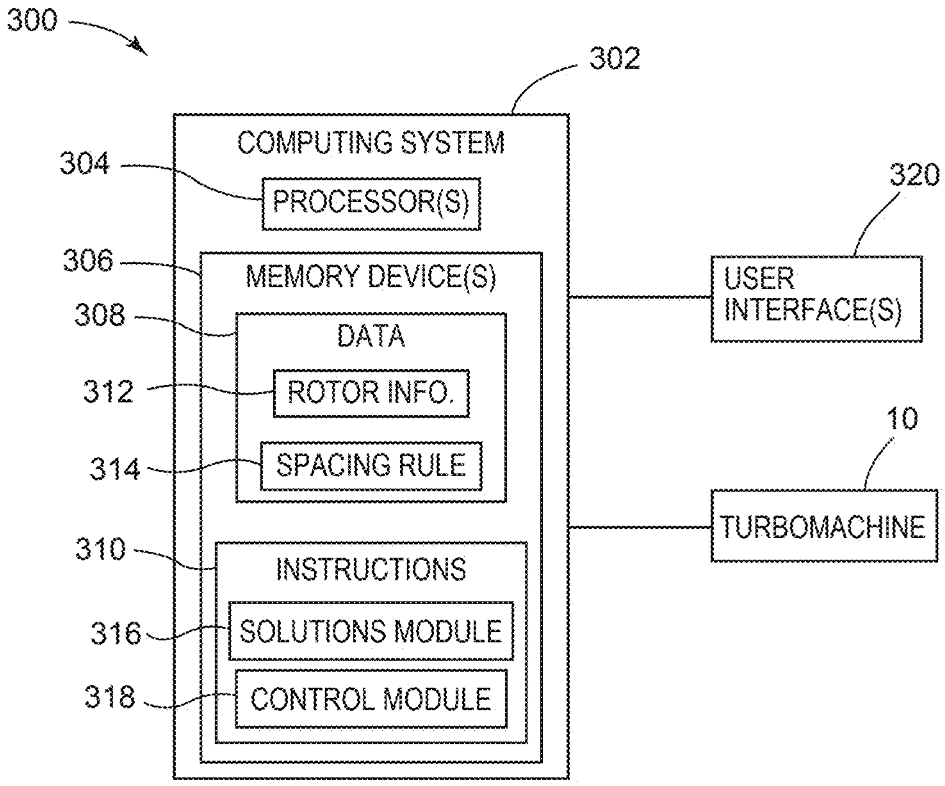
FIG. 6 illustrates a schematic view of a system for servicing a turbomachine in accordance with embodiments of the present disclosure.

As such, referring now to FIG. 6, a schematic view of a system 300 for servicing a turbomachine is illustrated in accordance with embodiments of the present disclosure. In general, the system 300 will be described herein with reference to the turbomachine 10 disclosed in FIG. 1, the turbine rotor and blade assembly 100 disclosed in FIGS. 2-4, and the example spacing rules 200A, 200B, 200C described with reference to FIGS. 5A-5C. However, it should be appreciated that, in general, the disclosed system 300 may be utilized with any suitable turbomachine having any suitable turbomachine configuration, with any suitable turbine rotor and blade assembly having any suitable assembly configuration, and/or with any suitable spacing rules.

As shown in FIG. 6, the system 300 may include a computing system 302 and various other components configured to be communicatively coupled to and/or controlled by computing system 302. For instance, computing system 302 may be communicatively coupled to and/or configured to control one or more user interface(s) 320. The user interface(s) 320 described herein may include, without limitation, any combination of input and/or output devices that allow an operator to provide inputs to computing system 302 and/or that allow computing system 302 to provide feedback to the operator, such as a keyboard(s), keypad(s), touchpad(s), pointing device(s), button(s), knob(s), slider(s), switch(es), display screen(s), touch sensitive screen(s), audio input device(s), audio output device(s), and/or the like. Additionally, in some instances, computing system 302 may be communicatively coupled to and/or configured to control the turbomachine 10 and/or components thereof.

It should be appreciated that computing system 302 may be any suitable controller or combination of controllers and generally include control circuitry having one or more processors 304 coupled to memory 306. Processor(s) 304 can include any suitable processing device(s) (e.g., a control circuitry, a processor core, a microprocessor, an application specific integrated circuit, a field programmable gate array, a controller, a microcontroller, etc.) and can be one processor or a plurality of processors that are operatively connected. Memory 306 can include one or more non-transitory computer-readable storage media, such as RAM, ROM, EEPROM, EPROM, one or more memory devices, flash memory devices, etc., and combinations thereof. Memory 306 can store data 308 that can be accessed by processor(s) 304 and/or computer-readable instructions 310 that can be executed by processor(s) 304.

For instance, data 308 may be stored in one or more databases. For example, data 308 may include a rotor information database 312 for storing data associated with the configuration of the rotor 102 of turbomachine 10 being serviced, such as the model of the turbomachine 10, the model of the rotor 102, the number of hook tabs of the rotor 102, current hook tabs 114 with dowel pin holes 122, the current number of stakes 126 at each current hook tab 114, the maximum number of stakes 126 for each dowel pin hole 122, the number of stakes 126 required for each dowel pin 124, and/or the like. In some instances, the rotor information stored in database 312 is received from an operator via the user interface(s) 320 and/or from a server database. Moreover, data 308 may include a spacing rule database 314 that includes one or more defined spacing rules (e.g., spacing rules 200A, 200B, 200C) and an indication of the selected spacing rule to be used for servicing. In some instances, the defined spacing rule(s) stored in database 314 are received from an operator via the user interface(s) 320 and/or from a server database.

Instructions 310 can be software, firmware, or both, written in any suitable programming language, or can be implemented in firmware or hardware. Additionally, or alternatively, instructions 310 can be executed in logically and/or virtually separate threads on processor(s) 304. For example, memory 306 can store instructions 310 that when executed by processor(s) 304 cause processor(s) 304 to perform operations such as any of the operations and functions as described herein. In some embodiments, for example, instructions 310 may be executed by processor(s) 304 to implement a solutions module 316. In general, the solutions module 316 may be configured to determine at least one desired servicing solution, each of the at least one desired servicing solution being identified by computing system 302 as having high, or a highest, number of potential future services. The solutions module 316 may determine the at least one desired servicing solution based at least in part on the rotor information 312 and spacing rule information 314 as will be described below in greater detail with reference to FIGS. 7A-7D.

Additionally, instructions 310 may be executed by processor(s) 304 to implement a control module 318. In general, the control module 318 may be configured to perform control actions associated with the at least one desired servicing solution. For instance, in some embodiments, the control actions may include automatically controlling an operation of the user interface(s) 320 to provide the at least one desired servicing solution. In some instances, the control actions may include automatically controlling an operation of the user interface(s) 320 to indicate the at least one desired solution and a number of potential future services for each of the at least one desired solution. In one or more instances, the control actions may include automatically controlling an operation of the user interface(s) 320 to highlight the at least one desired solution from other solutions, as will be described below in greater detail.

Referring now to FIGS. 7A-7D, various flow diagrams of an algorithm 400 for servicing a turbomachine are illustrated in accordance with embodiments of the present disclosure. In general, algorithm 400 will be described herein as being implemented by computing system 302 (e.g., as part of the solutions module 316) of system 300 described above with reference to FIG. 6. However, it should be appreciated that the various processes described below may alternatively be implemented by another computing device or any combination of computing devices. In addition, although FIGS. 7A-7D depict steps or functions performed in a particular order for purposes of illustration, the steps discussed herein are not necessarily limited to any particular order or arrangement, except where explicitly stated. One skilled in the art, using the disclosures provided herein, will appreciate that the various steps or functions of the algorithm disclosed herein can be omitted, rearranged, combined, and/or adapted in various ways without deviating from the scope of the present disclosure.

In some instances, algorithm 400 may be run in response to an input from an operator via user interface(s) 220, such as an input indicative of rotor servicing being performed. However, in some instances, algorithm 400 may automatically be performed, such as according to a pre-defined time interval, and/or the like.

Figure 7A:
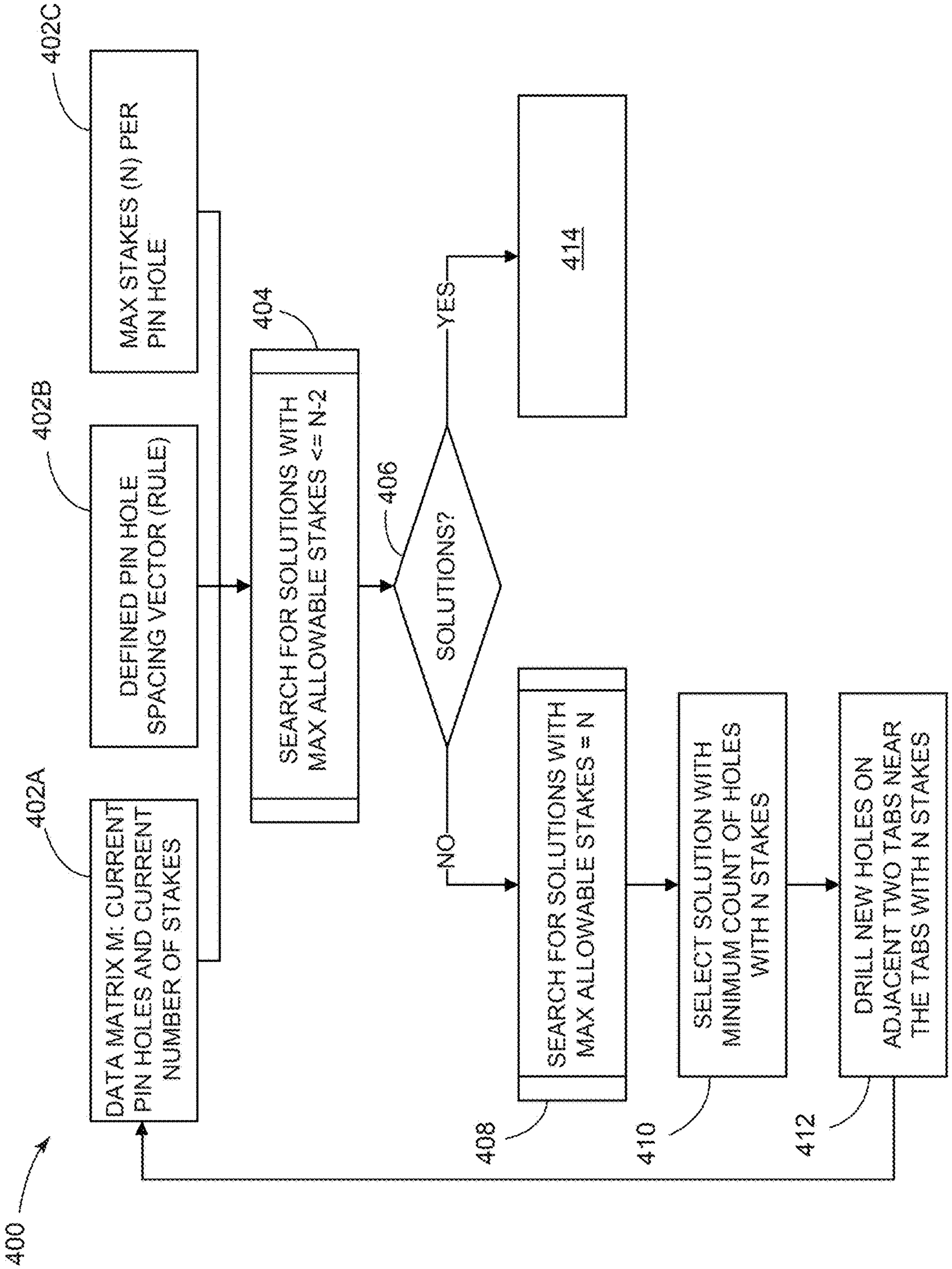
FIGS. 7A-7D illustrate flow diagrams of an algorithm for servicing a turbomachine in accordance with embodiments of the present disclosure.

As shown in FIG. 7A, the algorithm 400 may include computing system 302 receiving, at (402A), current data including an indication of each current hook tab 114 of the plurality of hook tabs 114 of the rotor 102 that currently has a dowel pin hole 122 and a current count of stakes 126 present at each current hook tab 114. In some instances, the current hook tabs 114 and current count of stakes 126 are provided in a data matrix M, such as with corresponding bucket number or hook tab number in a first column and corresponding number of current stakes in a second column. However, it should be appreciated that the current data may be provided in any other suitable manner. Moreover, at (402B), the algorithm 400 may include computing system 302 receiving a defined spacing rule (e.g., one of spacing rules 200A, 200B, 200C) to be used as the required spacing between hook tabs 114 receiving dowel pins 124. In some instances, the defined spacing rule is received as a vector. However, it should be appreciated that the defined spacing rule may be provided in any other suitable way. Additionally, at (402C), the algorithm 400 may include computing system 302 receiving an indication of the maximum number N of stakes 126 per dowel pin hole 122 (or per dowel pin 124) for the rotor 102. For instance, in some embodiments, the maximum number N is four (e.g., two pairs). In other embodiments, the maximum number N is six (e.g., three pairs). However, it should be appreciated that any suitable number may instead be used as the maximum number N, as discussed above.

At (404), the algorithm 400 may include computing system 302 searching for solutions having at least one potential service. For instance, computing system 302 may search for solutions where a current number of stakes 126 for each current hook tab 114 is less than or equal to a maximum allowable number of stakes. For instance, the maximum allowable number of stakes 126 for each hook tab 114 of a solution may be selected such that at least one service is possible (e.g., the maximum allowable number of stakes 126 is the maximum number N minus two, when a pair of stakes 126 is required for each dowel pin 124, or N minus one, when only one stake 126 is required for each dowel pin 124, etc.).

Figure 7B:
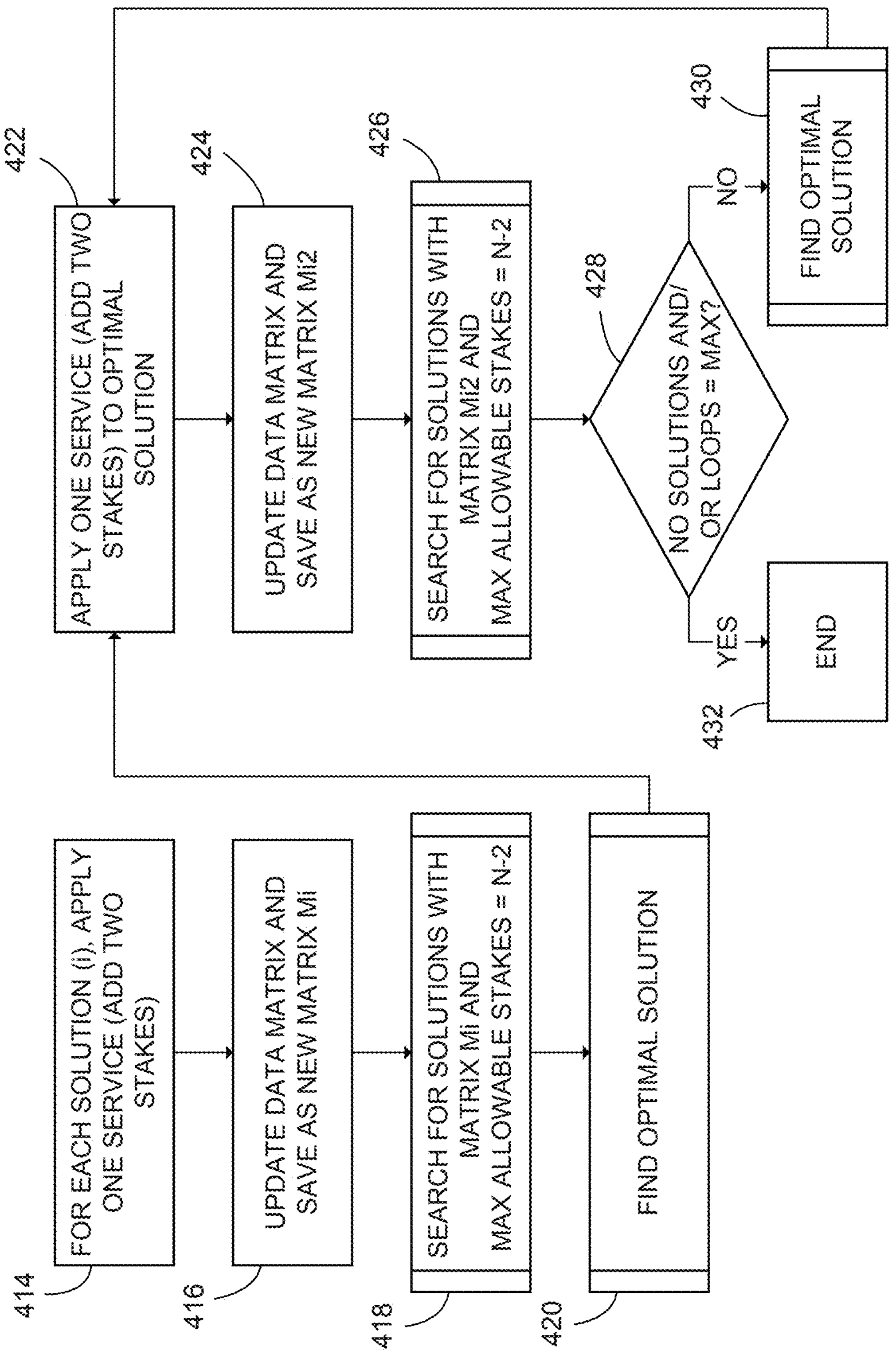
Figure 7C:
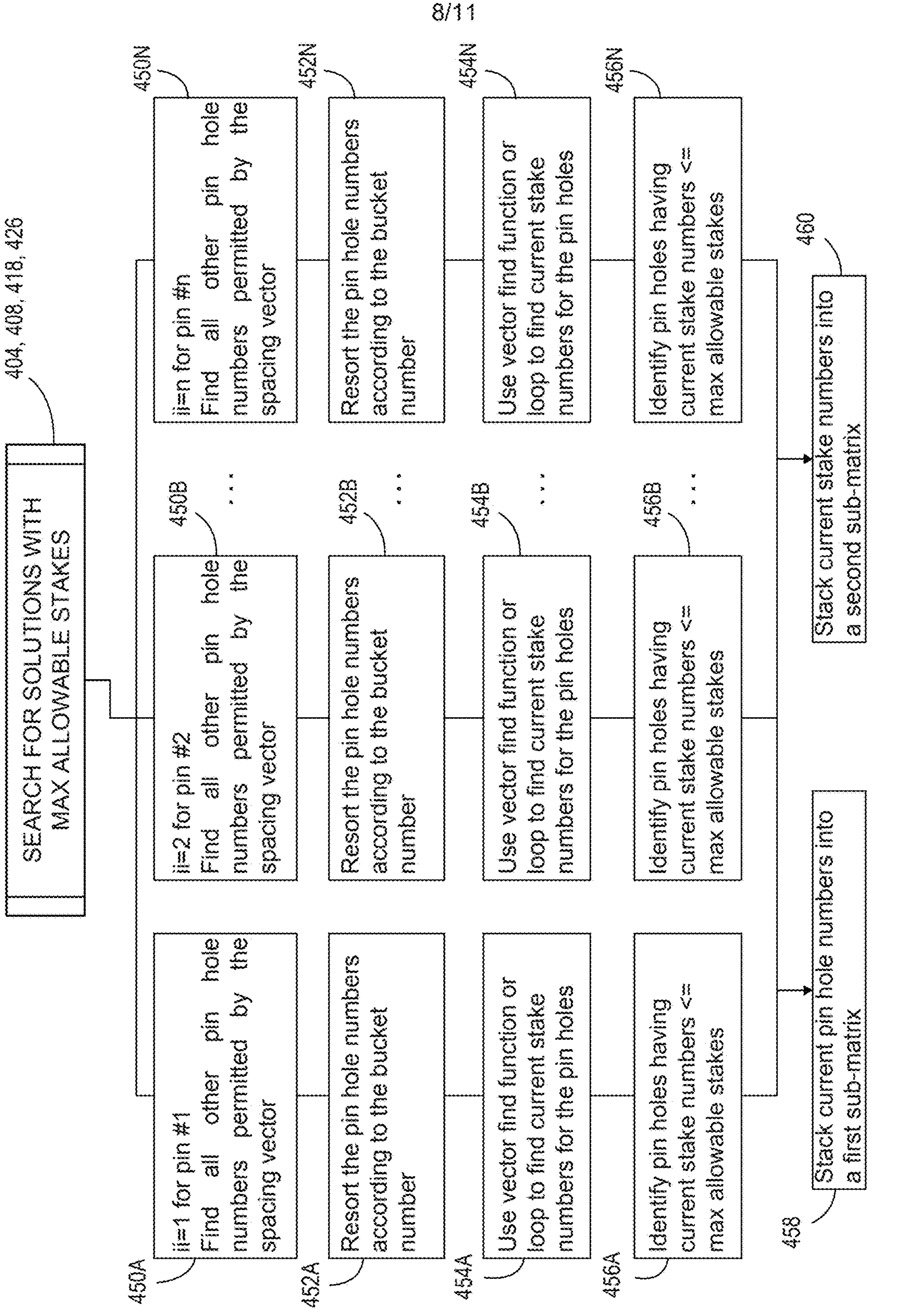

Particularly, as shown in FIG. 7C, to search for solutions at (404), computing system 302 may determine for each current hook tab 114, first solution combinations of other current hook tabs 114 of the plurality of current hook tabs 114 with the respective current hook element 114 based on the defined spacing rule, and determine the current number of stakes 126 at each of the hook elements 114 of each of the first potential combinations. More particularly, for a first of the current hook tabs 114, computing system 302 may determine, at (450A), first potential combinations of other current hook tabs 114 that, together with the first of the current hook tabs 114, would suit the selected defined spacing rule from (402B) in FIG. 7A. For example, when there are thirteen dowel pins that need placing, each current hook tab 114 may be combinable with twelve other current hook tabs 114 in each first potential combination that suits the defined spacing rule. Thereafter, at (452A), computing system 302 may re-sort the hook tabs 114 in each first potential combination from (450A) to correlate with the hook tab or bucket numbering in the matrix M, then, at (454A), find the number of current stakes 126 from the matrix M corresponding to each of the hook tabs 114 in the re-sorted, first potential combinations. At (456A), computing system 302 may identify first solution combinations as the first potential combinations where all hook tabs 114 have current stake numbers less than or equal to the maximum allowable number of stakes. For example, in FIG. 7A, the maximum allowable number of stakes 126 is set in (404) as the maximum number N minus two.

Computing system 302 may repeat the same steps for a second of the current hook tabs 114. For instance, for the second of the current hook tabs 114, computing system 302 may determine, at (450B), first potential combinations of other current hook tabs 114 that, together with the second of the current hook tabs 114, would suit the selected defined spacing rule from (402B) in FIG. 7A, re-sort the hook tabs 114 in each first potential combination at (452B) to correlate with the hook tab or bucket numbering in the matrix M, then find, at (454B), the corresponding number of current stakes 126 from the matrix M for each of the hook tabs 114 in the re-sorted, first potential combinations, and identify, at (456B), first solution combinations as the first potential combinations, where all hook tabs 114 in each first solution combinations have current stake numbers less than or equal to the maximum allowable number of stakes. Computing system 302 may repeat similar steps (450N, 452N, 454N, 456N) for each current hook tab through a nth current hook tab.

After all first solution combinations (if any) have been found where all hook tabs 114 in each first solution combination have current stake numbers less than or equal to the maximum allowable number of stakes, at (458), the hook tabs 114 of each first solution combination may be stacked into a first sub-matrix, and at (460), the current stake numbers for each of the hook tabs 114 of each first solution combination may be stacked into a second sub-matrix, then the algorithm returns to (406) in FIG. 7A.

At (406), it is determined whether any first solution combinations were returned at (404). If no first solution combinations were determined at (406) to have been returned at (404), then algorithm proceeds to (408). At (408), computing system 302 may search for alternate solution combinations based on the matrix M from (402A) where a current number of stakes 126 for each current hook tab 114 is less than or equal to a new maximum allowable number. For example, the new maximum allowable number is equal to the maximum number N of stakes. For instance, at (408) in FIG. 7C, computing system 302 may search for alternate solution combinations by performing substantially the same steps as described above with reference to (404), except that the maximum allowable number of stakes is now set equal to the maximum number N of stakes from (402C), where the output at steps (450A)-(450N) represent alternate potential solutions (instead of first potential solutions), and the matrices returned at (458) and (460) represent alternate solution combinations. Thereafter, at (410) in FIG. 7A, computing system 302 may select a drilling solution from the alternate solution combinations returned from (408) that has a fewest number or count of hook tabs 114 with the maximum number N of stakes (e.g., the fewest number of hook tabs 114 that have no more available stake holes 128). Thereafter, computing system 302 may recommend drilling of new dowel pin holes 122 in each hook element 114 of the plurality of hook elements 114 directly circumferentially adjacent to each hook element 114 that has the maximum number N of stakes in the drilling solution selected at (410). At (412), the recommended drilling may be carried out (e.g., by an operator or an automated drilling machine). An operator may provide confirmation to the computing system 302 that the drilling operation has been performed. For instance, computing system 302 may receive confirmation of the new dowel pin holes 122 being drilled, then update the data matrix M at (402A) in response to receiving the confirmation, and then algorithm 400 can be repeated with the current data matrix M after updating to find new first potential solution combinations.

If at least one first solution combination was determined at (406) to have been returned at (404), then algorithm proceeds to (414). In FIG. 7B, at (414), computing system 302 applies one theoretical service to each hook tab 114 in each first solution combination. For instance, for a theoretical service, computing system 302 increases the number of stakes 126 for each hook tab 114 in each first solution combination by a predefined service number (e.g., the predefined service number is two, when two stakes 126 are required for each dowel pin 124). Thereafter, at (416), computing system 302 creates a new matrix Mi for each first solution combination, which corresponds to data matrix M from (402A) updated according to the theoretical service performed for the respective first solution combination at (414).

Then, at (418), computing system 302 searches for solutions from each matrix Mi from (416) having a current number of stakes 126 for each current hook tab 114 is less than or equal to a maximum allowable number of stakes, where the maximum allowable number of stakes is set to less the maximum number N of stakes such that at least one service is possible (e.g., the maximum allowable number of stakes 126 is the maximum number N minus two, when a pair of stakes 126 is required for each dowel pin 124, or N minus one, when only one stake 126 is required for each dowel pin 124, etc.). For instance, at (418) in FIG. 7C, computing system 302 may search for solutions by performing substantially the same steps as described above with reference to (404), except that the input matrix is now the matrix Mi, with the maximum allowable number of stakes still being set equal to the maximum number N of stakes from (402C) minus two, where the output at steps (450A)-(450N) represent second potential solutions (instead of first potential solutions), and the matrices returned at (458) and (460) represent second solution combinations (instead of first solution combinations).

At (420) in FIG. 7B, computing system 302 may find an optimal solution from the second solution combinations. For instance, at (420) in FIG. 7D, for each matrix Mi generated at (416) and corresponding sub-matrices generated at (458) and (460) for each matrix Mi during step (418), computing system 302 may determine at (462) the number or count of hook tabs 114 in each second solution combination that has a maximum allowable number of stakes equal to the maximum number N of stakes minus two (e.g., how many hook tabs 114 are not "full" and have enough remaining stake holes 128 for at least one more service). The number of hook tabs 114 in each second solution combination determined at (462) may be returned as a first vector V1, or in any other suitable manner. At (464), computing system 302 may determine the number or count of hook tabs 114 in each second solution combination that has a maximum allowable number of stakes equal to the maximum number N of stakes minus four (e.g., how many hook tabs 114 are not "full" and have enough remaining stake holes 128 for at least two more services). The number of hook tabs 114 in each second solution combination determined at (464) may be returned as a second vector V2, or in any other suitable manner. Additionally, at (466), computing system 302 may determine the highest number or count of stakes 126 across the hook tabs 114 in each second solution combination. The highest number or count of stakes 126 in each second solution combination determined at (466) may be returned as a third vector V3, or in any other suitable manner.

Thereafter, computing system 302 may determine at (468) whether the highest number or count of stakes 126 across the hook tabs 114 of any of the second solution combinations determined at (466) is equal to or less than a predetermined maximum allowable number of stakes, particularly four less than the maximum number N of stakes (e.g., whether the current number of stakes 126 at each of the hook tabs 114 in the second potential combination allows for at least two potential future services). If any of the second solution combinations is determined at (468) to have equal to or less than the predetermined maximum allowable number of stakes (e.g., four less than the maximum number N of stakes) at each of the corresponding hook tabs 114, then algorithm proceeds to (470). At (470), computing system 302 determines which of the second solution combinations identified at (468) has the most empty hook tabs 114 by identifying the second solution combination from second vector V2 that has the fewest number of hook tabs 114 with four less than the maximum number N based on second vector V2. Otherwise, if none of the second solution combinations are determined at (468) to have equal to or less than the predetermined maximum allowable number of stakes (e.g., four less than the maximum number N of stakes) at each of the corresponding hook tabs 114, such as when one or more hook tabs 114 in each second solution combination is greater than the predetermined maximum number of stakes, then algorithm proceeds to (472). At (472), computing system 302 determines which of the second solution combinations has the least number of full hook tabs 114 by identifying the second solution combination from first vector V1 that has the fewest number of hook tabs 114 with current stakes equal to two less than the maximum number N.

Figure 7D:
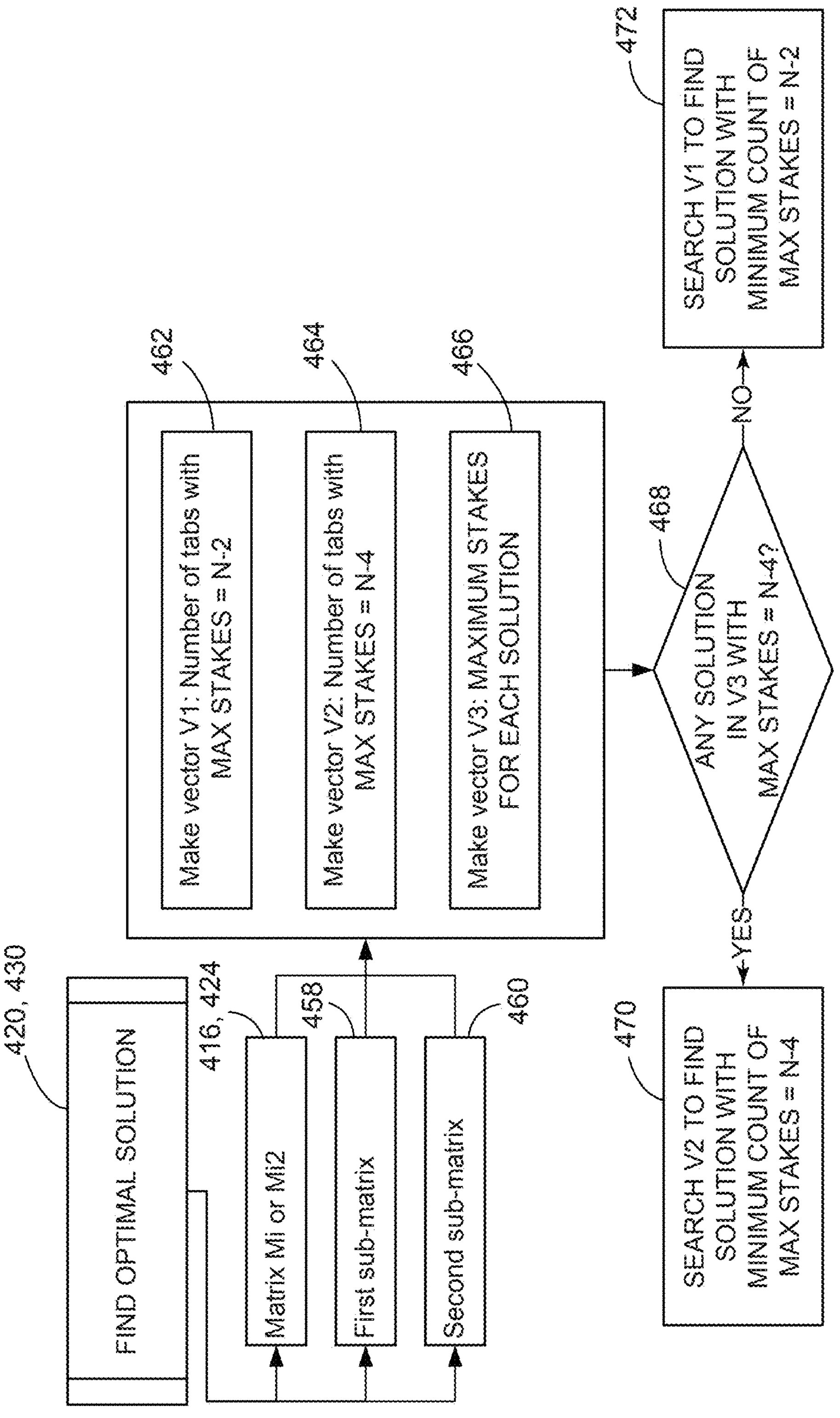

Once a single second solution combination is selected at (470) or (472) for a particular matrix Mi in FIG. 7D, at (422) in FIG. 7B, computing system 302 applies one theoretical service to each hook tab 114 in the second solution combination (e.g., adds two stakes 126 to each hook tab 114 in the selected, second solution combination). Thereafter, at (424), computing system 302 creates a new matrix Mi2 for each theoretically serviced second solution combination, which corresponds to data matrix Mi from (416) updated according to the theoretical service performed for the respective second solution combination at (422).

Then, at (426), computing system 302 searches for solutions from each matrix Mi2 from (424) where a current number of stakes 126 for each current hook tab 114 is less than or equal to a maximum allowable number of stakes, where the maximum allowable number of stakes is again set equal to the maximum number N of stakes minus two. For instance, at (426) in FIG. 7C, computing system 302 may search for solutions by performing substantially the same steps as described above with reference to (418), except that the input matrix is now the matrix Mi2, where the output at steps (450A)-(450N) represent third potential solutions (instead of second potential solutions), and the matrices returned at (458) and (460) represent third solution combinations (instead of second solution combinations).

Thereafter, at (428) in FIG. 7B, computing system 302 determines if any solutions were found at (426) or if a maximum number of loops has been performed. The maximum number of loops may generally correspond to a maximum number of theoretical services. For instance, a maximum number of theoretical services may be predetermined and set based on a planned service life for a particular rotor (e.g., 30 services, 20 services, 15 services, and/or the like), based on a number of services known to have already been performed and the planned service life for the particular rotor, or may be selected in any other suitable manner.

If one or more solutions (e.g., third solution combinations) were determined at (428) to have been found at (426), and the maximum number of loops was not reached, computing system 302 proceeds to determine at (430) an optimal solution of the solutions from (426) (e.g., of the third solution combinations). For instance, at (430) in FIG. 7D, computing system 302 may search for solutions by performing substantially the same steps as described above with reference to (420), except that each matrix Mi2 generated at (424) and corresponding sub-matrices generated at (458) and (460) for each matrix Mi2 at (426) are input to select an optimal third solution combination at (470) or (472) for each matrix Mi2. Once an optimal third solution combination is determined at (470) or (472) for each matrix Mi2, computing system 302 may loop from (430) in FIG. 7B back to (422) perform substantially similar steps for the optimal third solution combination(s).

If during a particular loop, no solutions (e.g., third solution combinations) were determined at (428) to be found at (426) and/or the maximum number of loops has been performed, the algorithm ends at (432).

When algorithm ends at (432), computing system 302 may be configured to control an operation of user interface (s) to indicate at least one desired solution. For instance, each, respective one of the at least one desired solution may correspond to a respective one of the first solution combinations determined at (404) (if any), the second solution combination determined for the respective, first solution combination at (420) (if any), the third solution combination determined for the respective, second solution combination at (430) (if any), and so on. In some instances, computing system 302 may help an operator decide between desired solutions, when multiple are present. For instance, computing system 302 may indicate the total number of potential future services (loops) available for each of the at least one desired solution. In one or more instances, computing system 302 may identify the desired solutions as only the first solution combination(s) having the highest number of potential future services. In one or more instances, computing system 302 may emphasize desired solution(s) with the highest number of potential future services from other ones of the desired solution(s). For example, computing system 302 may sort the first solution combinations based on number of potential future services from highest to lowest number of potential future services, may filter out or hide first solution combinations that have fewer than a certain number of potential future services, may highlight, color, underline, etc. the first solution combination(s) with the highest number of potential future services differently from first solution combination(s) with lower numbers of potential future services, and/or the like.

Figure 8:
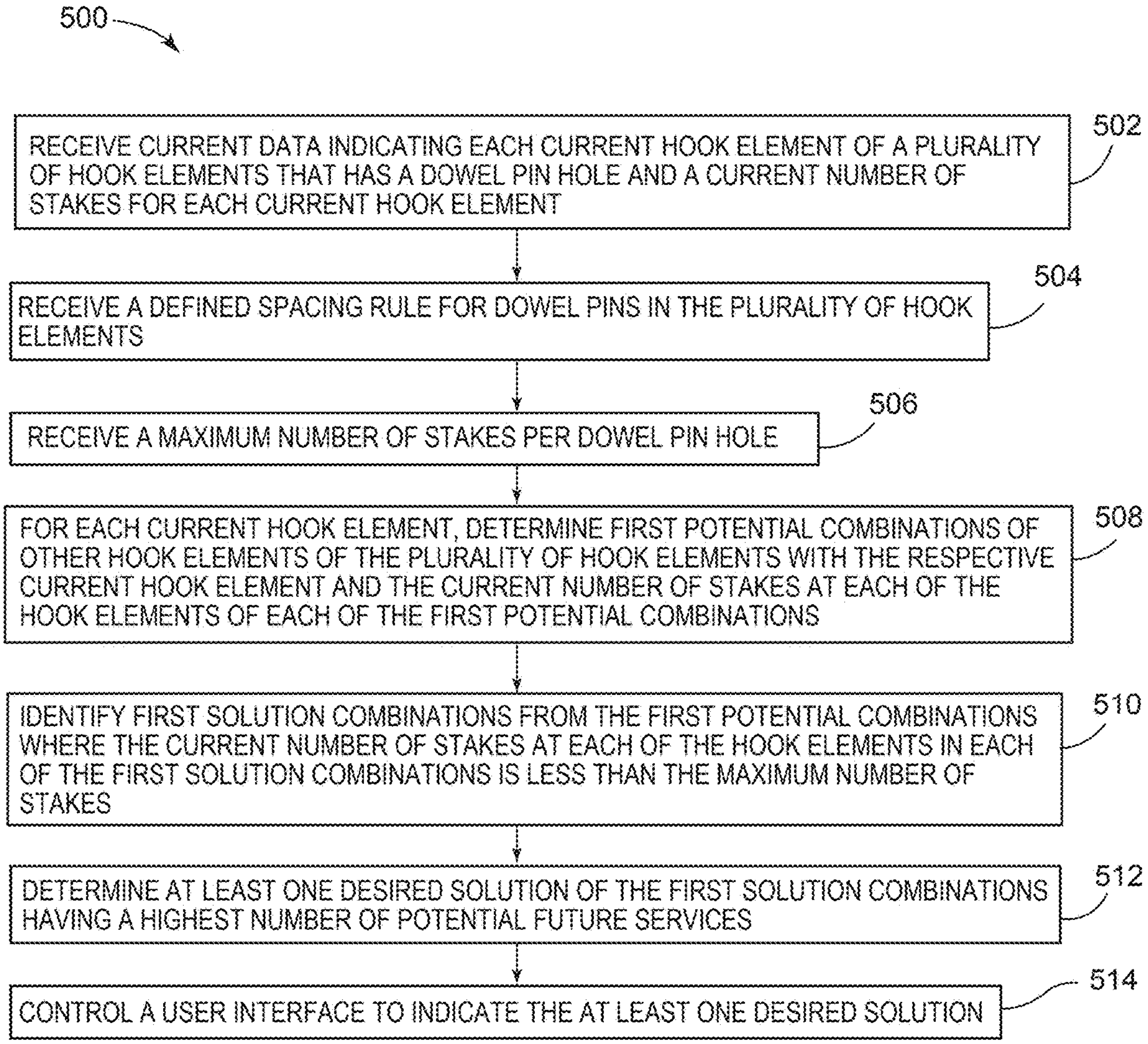
FIG. 8 illustrates a flow diagram of an example method for servicing a turbomachine in accordance with embodiments of the present disclosure.

FIG. 8 illustrates a flow diagram of an example method 500 for servicing a turbomachine in accordance with embodiments of the present disclosure. In general, method 500 will be described herein as being implemented by computing system 302 described above with reference to FIG. 6 and the algorithm 400 described above with reference to FIGS. 7A-7D. However, it should be appreciated that the various processes described below may alternatively be implemented by another computing device or any combination of computing devices. In addition, although FIG. 8 depicts steps or functions performed in a particular order for purposes of illustration, the steps discussed herein are not necessarily limited to any particular order or arrangement, except where explicitly stated. One skilled in the art, using the disclosures provided herein, will appreciate that the various steps or functions of the method disclosed herein can be omitted, rearranged, combined, and/or adapted in various ways without deviating from the scope of the present disclosure.

As shown in FIG. 8, at (502), the method 500 may include receiving current data indicating each current hook element of a plurality of hook elements that has a dowel pin hole and a current number of stakes for each current hook element. For instance, as discussed above, computing system 302 may receive current data (e.g., matrix M) from a user via user interface(s) 320, where the current data indicates each current hook element (e.g., current hook tab 114) of a plurality of hook tabs 114 that has a dowel pin hole 122 and indicates a current number of stakes 126 for each current hook element 114.

Further, at (504), the method 500 may include receiving a defined spacing rule for dowel pins in the plurality of hook elements. For example, as discussed above, computing system 302 may receive a defined spacing rule, such as spacing rule 200, 200B, 200C, for dowel pins 124 in the plurality of hook tabs 114 from a user via user interface(s) 320 and/or any other suitable source.

At (506), the method 500 may further include receiving a maximum number of stakes per dowel pin hole. For instance, as described above, computing system 302 may receive the maximum number N of stakes 126 (e.g., four or six stakes 126) that may be positioned around each dowel pin hole 122 in a given hook tab 114 from a user via user interface(s) 320 and/or any other suitable source.

At (508), the method 500 may include, for each current hook element, determining first potential combinations of other hook elements of the plurality of hook elements with the respective current hook element and the current number of stakes at each of the hook elements of each of the first potential combinations. For instance, as described above, computing system 302 may determine, for each current hook tab 114 identified in the current data, first potential combinations of other, current hook tabs 114 with the respective, current hook tab 114 that satisfy the defined spacing rule, and determine the corresponding, current number of stakes 126 at each of the hook tabs 114 of each of the first potential combinations.

Furthermore, at (510), the method 500 may include identifying first solution combinations from the first potential combinations where the current number of stakes at each of the hook elements in each of the first solution combinations is less than the maximum number of stakes. For example, as described above, computing system 302 may identify first solution combinations from the first potential combinations, particularly where the current number of stakes 126 at each of the hook tabs 114 in each of the first solution combinations is less than the maximum number N of stakes 126.

Moreover, at (512), the method 500 may include determining at least one desired solution of the first solution combinations having a highest number of potential future services. For instance, as discussed above, computing system 302 may determine at least one desired solution of the first solution combinations having a highest number of potential future services (loops).

Additionally, at (514), the method 500 may include controlling a user interface to indicate the at least one desired solution. For example, as described above, computing system 302 may control an operation of user interface(s) 320 to indicate the at least one desired solution.

Figure 9:
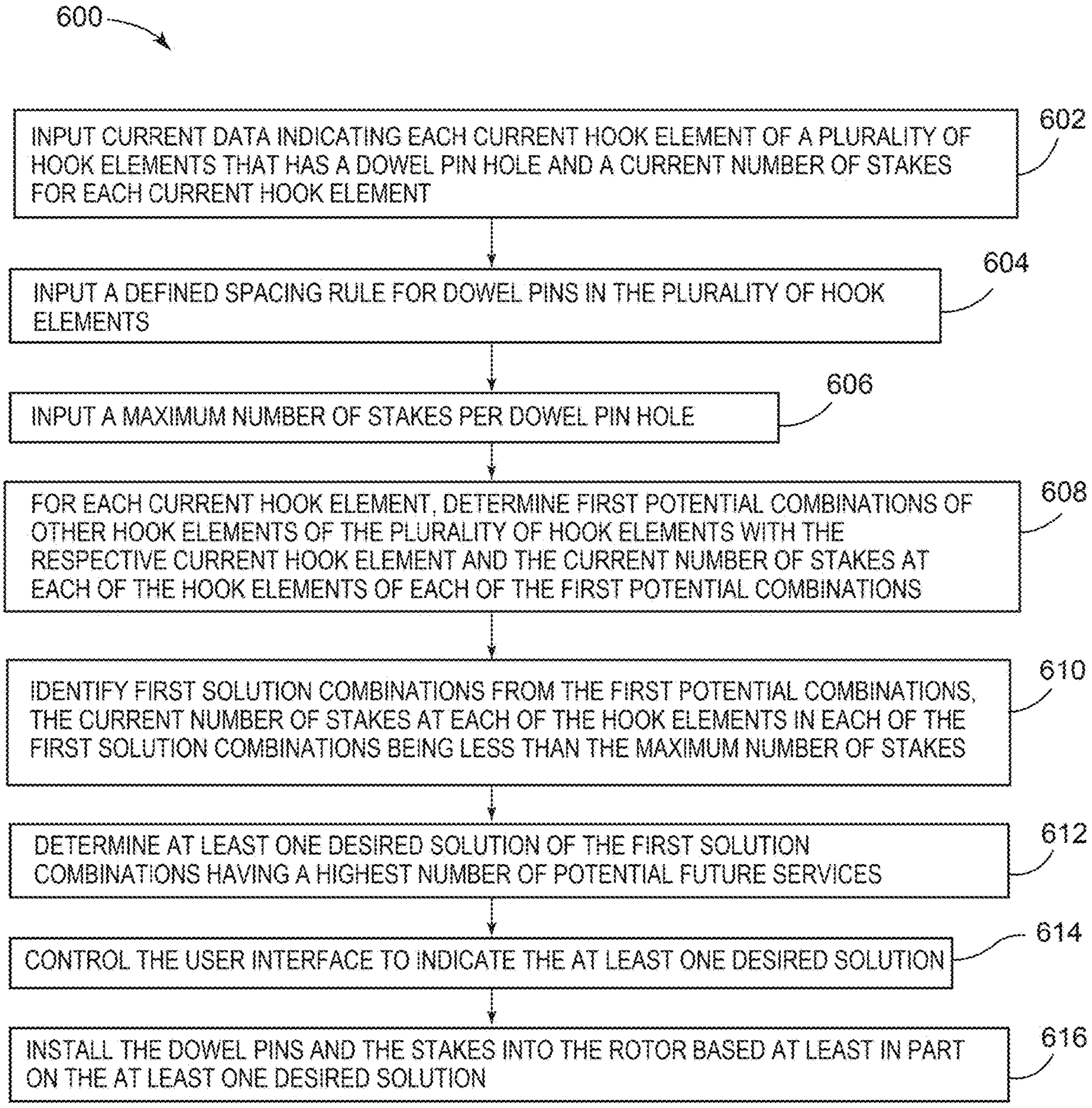
FIG. 9 illustrates a flow diagram of another example method for servicing a turbomachine in accordance with embodiments of the present disclosure.

FIG. 9 illustrates a flow diagram of another example method 600 for servicing a turbomachine in accordance with embodiments of the present disclosure. In general, method 600 will be described herein as being implemented by computing system 302 described above with reference to FIG. 6 and the algorithm 400 described above with reference to FIGS. 7A-7D. However, it should be appreciated that the various processes described below may alternatively be implemented by another computing device or any combination of computing devices. In addition, although FIG. 9 depicts steps or functions performed in a particular order for purposes of illustration, the steps discussed herein are not necessarily limited to any particular order or arrangement, except where explicitly stated. One skilled in the art, using the disclosures provided herein, will appreciate that the various steps or functions of the method disclosed herein can be omitted, rearranged, combined, and/or adapted in various ways without deviating from the scope of the present disclosure.

As shown in FIG. 9, at (602), the method 600 may include inputting current data indicating each current hook element of a plurality of hook elements that has a dowel pin hole and a current number of stakes for each current hook element. For instance, as discussed above, a user may input, via user interface(s) 320, current data (e.g., matrix M) into computing system 302, where the current data indicates each current hook element (e.g., current hook tab 114) of a plurality of hook tabs 114 that has a dowel pin hole 122 and indicates a current number of stakes 126 for each current hook element 114.

Further, at (604), the method 600 may include inputting a defined spacing rule for dowel pins in the plurality of hook elements. For example, as discussed above, a user may input into computing system 302, via user interface(s) 320, a defined spacing rule, such as spacing rule 200, 200B, 200C, for dowel pins 124 in the plurality of hook tabs 114.

At (606), the method 600 may further include inputting a maximum number of stakes per dowel pin holes. For instance, as described above, a user may input into computing system 302, via user interface(s) 320, the maximum number N of stakes 126 (e.g., four or six stakes 126) that may be positioned around each dowel pin hole 122 in a given hook tab 114.

At (608), the method 600 may include for each current hook element, determining first potential combinations of other hook elements of the plurality of hook elements with the respective current hook element and the current number of stakes at each of the hook elements of each of the first potential combinations. For instance, as described above, computing system 302 may determine, for each current hook tab 114 identified in the current data, first potential combinations of other, current hook tabs 114 with the respective, current hook tab 114 that satisfy the defined spacing rule, and determine the corresponding, current number of stakes 126 at each of the hook tabs 114 of each of the first potential combinations.

Furthermore, at (610), the method 600 may include identifying first solution combinations from the first potential combinations where the current number of stakes at each of the hook elements in each of the first solution combinations is less than the maximum number of stakes. For example, as described above, computing system 302 may identify first solution combinations from the first potential combinations, particularly where the current number of stakes 126 at each of the hook tabs 114 in each of the first solution combinations is less than the maximum number N of stakes 126.

At (612), the method 600 may include determining at least one desired solution of the first solution combinations having a highest number of potential future services. For instance, as discussed above, computing system 302 may determine at least one desired solution of the first solution combinations having a highest number of potential future services (loops).

Moreover, at (614), the method 600 may include controlling a user interface to indicate the at least one desired solution. For example, as described above, computing system 302 may control an operation of user interface(s) 320 to indicate the at least one desired solution.

Additionally, at (616), the method 600 may include installing the dowel pins and the stakes into the rotor based at least in part on the at least one desired solution. For instance, once the user interface(s) 320 has been controlled to indicate the at least one desired solution, a user may install dowel pins 124 and corresponding stakes 126 into the rotor 102 according to one of the at least one desired solution.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for servicing a turbomachine, the turbomachine having a rotor and a plurality of rotor blades, and the rotor having a plurality of hook elements for receiving a retention device. The method includes receiving, by a computing system, current data indicating each current hook element of the plurality of hook elements that has a dowel pin hole and a current number of stakes for each current hook element. The method further includes receiving, by the computing system, a defined spacing rule for dowel pins in the plurality of hook elements. Further, the method includes receiving, by the computing system, a maximum number of stakes per dowel pin hole. Furthermore, the method includes determining, by the computing system, for each current hook element, first potential combinations of other hook elements of the plurality of hook elements with the respective current hook element based on the defined spacing rule, and the current number of stakes at each of the hook elements of each of the first potential combinations. The method includes identifying, by the computing system, first solution combinations from the first potential combinations, the current number of stakes at each of the hook elements in each of the first solution combinations being less than the maximum number of stakes. Moreover, the method includes determining, by the computing system, at least one desired solution of the first solution combinations having a highest number of potential future services. Additionally, the method includes controlling, by the computing system, a user interface to indicate the at least one desired solution.

A method for servicing a turbomachine, the turbomachine having a rotor and a plurality of rotor blades, the rotor having a plurality of hook elements for receiving a retention device. The method includes inputting, via a user interface of a computing system, current data indicating each current hook element of the plurality of hook elements that has a dowel pin hole and a current number of stakes for each current hook element. The method further includes inputting, via the user interface of the computing system, a defined spacing rule for dowel pins in the plurality of hook elements. Further, the method includes inputting, via the user interface of the computing system, a maximum number of stakes per dowel pin hole. Furthermore, the method includes determining, by the computing system, for each current hook element, first potential combinations of other hook elements of the plurality of hook elements with the respective current hook element based on the defined spacing rule, and the current number of stakes at each of the hook elements of each of the first potential combinations. The method further includes identifying, by the computing system, first solution combinations from the first potential combinations, the current number of stakes at each of the hook elements in each of the first solution combinations being less than the maximum number of stakes. The method includes determining, by the computing system, at least one desired solution of the first solution combinations having a highest number of potential future services. Moreover, the method includes controlling, by the computing system, the user interface to indicate the at least one desired solution. Additionally, the method includes installing the dowel pins and the stakes into the rotor based at least in part on the at least one desired solution.

The method of one or more of the above clauses, wherein controlling the user interface to indicate the at least one desired solution includes controlling the user interface to indicate the at least one desired solution and a number of potential future services for each of the at least one desired solution.

The method of one or more of the above clauses, wherein controlling the user interface to indicate the at least one desired solution includes controlling the user interface to highlight the at least one desired solution from remaining ones of the first solution combinations.

The method of one or more of the above clauses, wherein determining the at least one desired solution includes, for each given first solution combination of the first solution combinations: increasing, by the computing system, the current number of stakes at each of the hook elements of the given first solution combination in the current data by a predefined service number; determining, by the computing system, for each of the hook elements of the given first solution combination after increasing the current number of stakes, second potential combinations of further hook elements of the plurality of hook elements with the respective hook element based on the defined spacing rule, and the current number of stakes at each of the hook elements of each of the second potential combinations; and identifying, by the computing system, a second solution combination from the second potential combinations, the at least one desired solution being determined based at least in part on the second solution combination.

The method of one or more of the above clauses, wherein identifying the second solution combination includes identifying the second solution combination as one of the second potential combinations having: a lowest number of hook elements with less than the maximum number of stakes when the current number of stakes at each of the hook elements in each of the second potential combinations is less than or equal to a predetermined number; or a lowest number of hook elements with the maximum number of stakes when the current number of stakes at each of the hook elements in each of the second potential combinations is greater than the predetermined number.

The method of one or more of the above clauses, wherein, when there are no first solution combinations identified, the method further includes: identifying, by the computing system, alternate solution combinations, the current number of stakes at each of the hook elements in each of the alternate solution combinations being equal to the maximum number of stakes; identifying, by the computing system, a drilling solution of the alternate solution combinations having a minimum number of hook elements with the maximum number of stakes; and recommending, by the computing system, drilling of new dowel pin holes in each hook element of the plurality of hook elements directly circumferentially adjacent to each hook element of the drilling solution having the maximum number of stakes.

The method of one or more of the above clauses, further including receiving, by the computing system, confirmation of the new dowel pin holes being drilled; updating, by the computing system, the current data in response to receiving the confirmation; and determining, by the computing system, new first potential combinations based at least in part on the current data after updating.

A system for servicing a turbomachine. The system includes a turbomachine having a rotor and a plurality of rotor blades, with the rotor having a plurality of hook elements for receiving a retention device. The system further includes a user interface. Additionally, the system includes a computing system. The computing system is configured to receive current data indicating each current hook element of the plurality of hook elements that has a dowel pin hole and a current number of stakes for each current hook element, receive a defined spacing rule for dowel pins in the plurality of hook elements, and receive a maximum number of stakes per dowel pin hole. The computing system is further configured to determine for each current hook element, first potential combinations of other hook elements of the plurality of hook elements with the respective current hook element based on the defined spacing rule, and the current number of stakes at each of the hook elements of each of the first potential combinations. The computing system is configured to identify first solution combinations from the first potential combinations, the current number of stakes at each of the hook elements in each of the first solution combinations being less than the maximum number of stakes. Moreover, the computing system is further configured to determine at least one desired solution of the first solution combinations having a highest number of potential future services. Additionally, the computing system is configured to control the user interface to indicate the at least one desired solution.

The system of one or more of these clauses, wherein the computing system being configured to control the user interface to indicate the at least one desired solution includes the computing system being configured to control the user interface to indicate the at least one desired solution and a number of potential future services for each of the at least one desired solution.

The system of one or more of these clauses, wherein the computing system being configured to control the user interface to indicate the at least one desired solution includes the computing system being configured to control the user interface to highlight the at least one desired solution from remaining ones of the first solution combinations.

The system of one or more of these clauses, wherein the computing system being configured to determine the at least one desired solution includes the computing system being configured to, for each given first solution combination of the first solution combinations: increase the current number of stakes at each of the hook elements of the given first solution combination in the current data by a predefined service number; determine for each of the hook elements of the given first solution combination after increasing the current number of stakes, second potential combinations of further hook elements of the plurality of hook elements with the respective hook element based on the defined spacing rule, and the current number of stakes at each of the hook elements of each of the second potential combinations; and identify a second solution combination from the second potential combinations, the at least one desired solution being determined based at least in part on the second solution combination.

The system of one or more of these clauses, wherein the plurality of hook elements include a plurality of hook tabs, and the retention device includes a lockwire.

What is claimed is:

1. A method for servicing a turbomachine, the turbomachine having a rotor and a plurality of rotor blades, the rotor having a plurality of hook elements for receiving a retention device, the method comprising:

receiving, by a computing system, current data indicating each current hook element of the plurality of hook elements that has a dowel pin hole and a current number of stakes for each current hook element;

receiving, by the computing system, a defined spacing rule for dowel pins in the plurality of hook elements;

receiving, by the computing system, a maximum number of stakes per dowel pin hole;

receiving, by the computing system, an input from an operator via a user interface indicative of rotor servicing being performed;

determining, by the computing system in response to receiving the input from the operator indicative of rotor servicing being performed, for each current hook element, first potential combinations of other hook elements of the plurality of hook elements with the respective current hook element based on the defined spacing rule, and the current number of stakes at each of the hook elements of each of the first potential combinations;

identifying, by the computing system, whether first solution combinations exist from the first potential combinations, the current number of stakes at each of the hook elements in each of the first solution combinations being less than the maximum number of stakes; and when the first solution combinations are identified to exist:

determining, by the computing system, at least one desired solution of the first solution combinations having a highest number of potential future services;

controlling, by the computing system, the user interface to highlight the at least one desired solution from remaining ones of the first solution combinations; and installing the dowel pins and the stakes into the rotor based at least in part on the at least one desired solution.

2. The method of claim 1, wherein controlling the user interface to indicate the at least one desired solution further comprises indicating a number of potential future services for each of the at least one desired solution.

3. The method of claim 1, wherein determining the at least one desired solution comprises, for each given first solution combination of the first solution combinations:

increasing, by the computing system, the current number of stakes at each of the hook elements of the given first solution combination in the current data by a predefined service number;

determining, by the computing system, for each of the hook elements of the given first solution combination after increasing the current number of stakes, second potential combinations of further hook elements of the plurality of hook elements with the respective hook element based on the defined spacing rule, and the current number of stakes at each of the hook elements of each of the second potential combinations; and identifying, by the computing system, a second solution combination from the second potential combinations, the at least one desired solution being determined based at least in part on the second solution combination.

4. The method of claim 3, wherein identifying the second solution combination comprises identifying the second solution combination as one of the second potential combinations having:

a lowest number of hook elements with less than the maximum number of stakes when the current number of stakes at each of the hook elements in each of the second potential combinations is less than or equal to a predetermined number; or a lowest number of hook elements with the maximum number of stakes when the current number of stakes at one or more of the hook elements in each of the second potential combinations is greater than the predetermined number.

5. The method of claim 1, wherein, when no first solution combinations are identified, the method further comprises:

identifying, by the computing system, alternate solution combinations, the current number of stakes at each of the hook elements in each of the alternate solution combinations being equal to the maximum number of stakes;

identifying, by the computing system, a drilling solution of the alternate solution combinations having a minimum number of hook elements with the maximum number of stakes; and recommending, by the computing system, drilling of new dowel pin holes in each hook element of the plurality of hook elements directly circumferentially adjacent to each hook element of the drilling solution having the maximum number of stakes.

6. The method of claim 5, further comprising receiving, by the computing system, confirmation of the new dowel pin holes being drilled;

updating, by the computing system, the current data in response to receiving the confirmation; and determining, by the computing system, new first potential combinations based at least in part on the current data after updating.

7. A method for servicing a turbomachine, the turbomachine having a rotor and a plurality of rotor blades, the rotor having a plurality of hook elements for receiving a retention device, the method comprising:

inputting, via a user interface of a computing system, current data indicating each current hook element of the plurality of hook elements that has a dowel pin hole and a current number of stakes for each current hook element;

inputting, via the user interface of the computing system, a defined spacing rule for dowel pins in the plurality of hook elements;

inputting, via the user interface of the computing system, a maximum number of stakes per dowel pin hole;

determining, by the computing system, for each current hook element, first potential combinations of other hook elements of the plurality of hook elements with the respective current hook element based on the defined spacing rule, and the current number of stakes at each of the hook elements of each of the first potential combinations;

identifying, by the computing system, whether one or more first solution combinations exist from the first potential combinations, the current number of stakes at each of the hook elements in each of the one or more first solution combinations being less than the maximum number of stakes; and when the one or more first solution combinations are identified to exist:

determining, by the computing system, at least one desired solution of the one or more first solution combinations having a highest number of potential future services;

controlling, by the computing system, the user interface to indicate the at least one desired solution; and installing the dowel pins and the stakes into the rotor based at least in part on the at least one desired solution.

8. The method of claim 7, wherein controlling the user interface further comprises indicating a number of potential future services for each of the at least one desired solution.

9. The method of claim 7, wherein controlling the user interface further comprises highlighting the at least one desired solution from remaining ones of the one or more first solution combinations.

10. The method of claim 7, wherein determining the at least one desired solution comprises, for each given first solution combination of the one or more first solution combinations:

increasing, by the computing system, the current number of stakes at each of the hook elements of the given first solution combination in the current data by a predefined service number;

determining, by the computing system, for each of the hook elements of the given first solution combination after increasing the current number of stakes, second potential combinations of further hook elements of the plurality of hook elements with the respective hook element based on the defined spacing rule, and the current number of stakes at each of the hook elements of each of the second potential combinations; and identifying, by the computing system, a second solution combination from the second potential combinations, the at least one desired solution being determined based at least in part on the second solution combination.

11. The method of claim 10, wherein identifying the second solution combination comprises identifying the second solution combination as one of the second potential combinations having:

a lowest number of hook elements with less than the maximum number of stakes when the current number of stakes at each of the hook elements in each of the second potential combinations is less than or equal to a predetermined number; or a lowest number of hook elements with the maximum number of stakes when the current number of stakes at one or more of the hook elements in each of the second potential combinations is greater than the predetermined number.

12. The method of claim 7, wherein, when one or more first solution combinations are not identified, the method further comprises:

identifying, by the computing system, alternate solution combinations, the current number of stakes at each of the hook elements in each of the alternate solution combinations being equal to the maximum number of stakes;

identifying, by the computing system, a drilling solution of the alternate solution combinations having a minimum number of hook elements with the maximum number of stakes; and recommending, by the computing system, drilling of new dowel pin holes in each hook element of the plurality of hook elements directly circumferentially adjacent to each hook element of the drilling solution having the maximum number of stakes.

13. The method of claim 12, further comprising:

performing the drilling of new dowel pin holes;

receiving, by the computing system, confirmation of the new dowel pin holes being drilled;

updating, by the computing system, the current data in response to receiving the confirmation; and determining, by the computing system, one or more new first potential combinations based at least in part on the current data after updating.

* * * * *